D. SMITH.
Sleigh-Shaft Attachment.
No. 162,861.    Patented May 4, 1875.
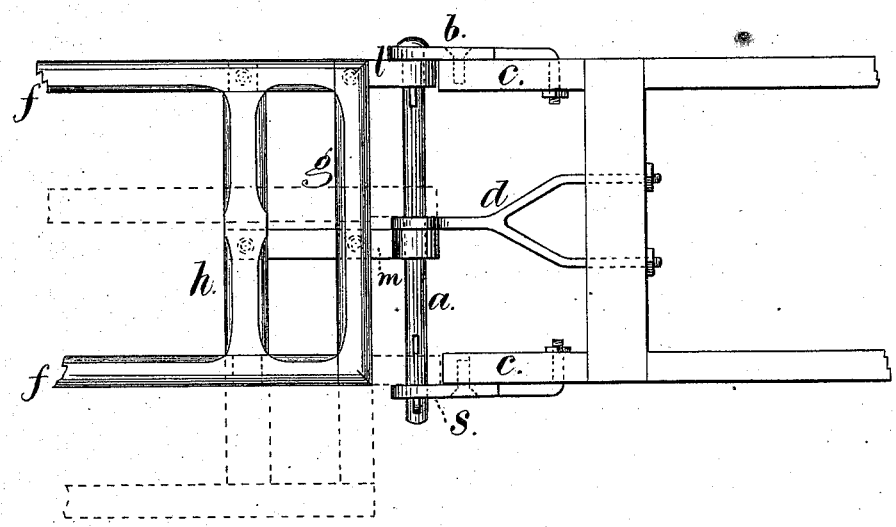
Witnesses
Chas. H. Smith
Harold Serrell
Inventor
David Smith
per Lemuel W. Serrell
atty

UNITED STATES PATENT OFFICE.

DAVID SMITH, OF JOHNSTOWN, NEW YORK.

IMPROVEMENT IN SLEIGH-SHAFT ATTACHMENTS.

Specification forming part of Letters Patent No. 162,861, dated May 4, 1875; application filed February 27, 1875.

*To all whom it may concern:*

Be it known that I, DAVID SMITH, of Johnstown, in the county of Fulton and State of New York, have invented an Improvement in Attaching Shafts to Sleighs, of which the following is a specification:

Shafts have been attached to sleighs in such a manner as to be shifted from a central position to the side, and vice versa, according to the condition of the road, so as to allow the sleigh to run upon the smoothest portion of the snow, while the horse remains in the track, but the means for shifting the shafts have been liable to injury by the strain, or else expensive and difficult to apply.

I make use of a cross-bar in front of the sleigh, with a central brace running back to the sleigh, and upon the shafts two straps and eyes are attached, the said cross-bar passing through the eyes, and one of the straps being connected near the center of the cross-braces of the shafts, so that the shafts can be slipped to the right or left upon the cross-bar, and held by a key or thong through a mortise in said cross-bar. By this means the line of draft is such that there is no tendency to bend or bind any of the parts, and strength and lightness are secured.

In the drawing, a plan view is shown of the parts, and the two positions of the shafts are shown in dotted and full lines.

The cross-bar $a$ is sustained at its ends by the straps $b$ $s$, to the runners $c$, and also by the center strap $d$, that has an eye at the front end, through which the bar $a$ passes, and at the back end the said strap is attached to the sleigh. I remark that the sleigh and runners are to be of any character. The shafts $f$ are made with the cross-pieces or braces $g$ $h$, as usual, and the whiffletree is generally attached to the center of the cross-piece $h$. The straps $l$ and $m$ are made with eyes sufficiently large to slide freely upon the cross-bar $a$, and one of these is attached to one of the shafts $f$, and the other is attached to the cross-pieces $g$ $h$ of the shafts, and near the middle.

It will now be evident that when the horse is centrally in front of the sleigh, and the shafts are in the position shown by full lines, the draft will be by the straps $l$ and $m$, almost direct upon the straps $b$ and $d$, and that when the shafts are slipped along so that the horse is at one side to the sleigh the straps $l$ and $m$ are contiguous to the straps $d$ and $s$, so that the bar $a$ and straps are not liable to be bent, and do not require to be stronger than those usually employed.

A key or thong inserted in one of the mortises $o$ in the cross-bar $a$ retains the shafts when shifted.

I do not claim the devices shown in the patent of G. Kenny, September 15, 1856.

I claim as my invention—

The cross-bar $a$, in combination with the central strap $d$, shafts $f$, and straps $l$ $m$, one of which is attached near the center of the cross-piece of the shafts, all substantially as and for the purposes set forth.

Signed by me this 20th day of February, 1875.

DAVID SMITH.

Witnesses:
GEORGE BURNS,
JACOB BURTON, Jr.